March 8, 1966  C. CAMOSSI  3,238,744
VIBRATION AND SHOCK ABSORBER IN COUPLING
Filed July 29, 1963
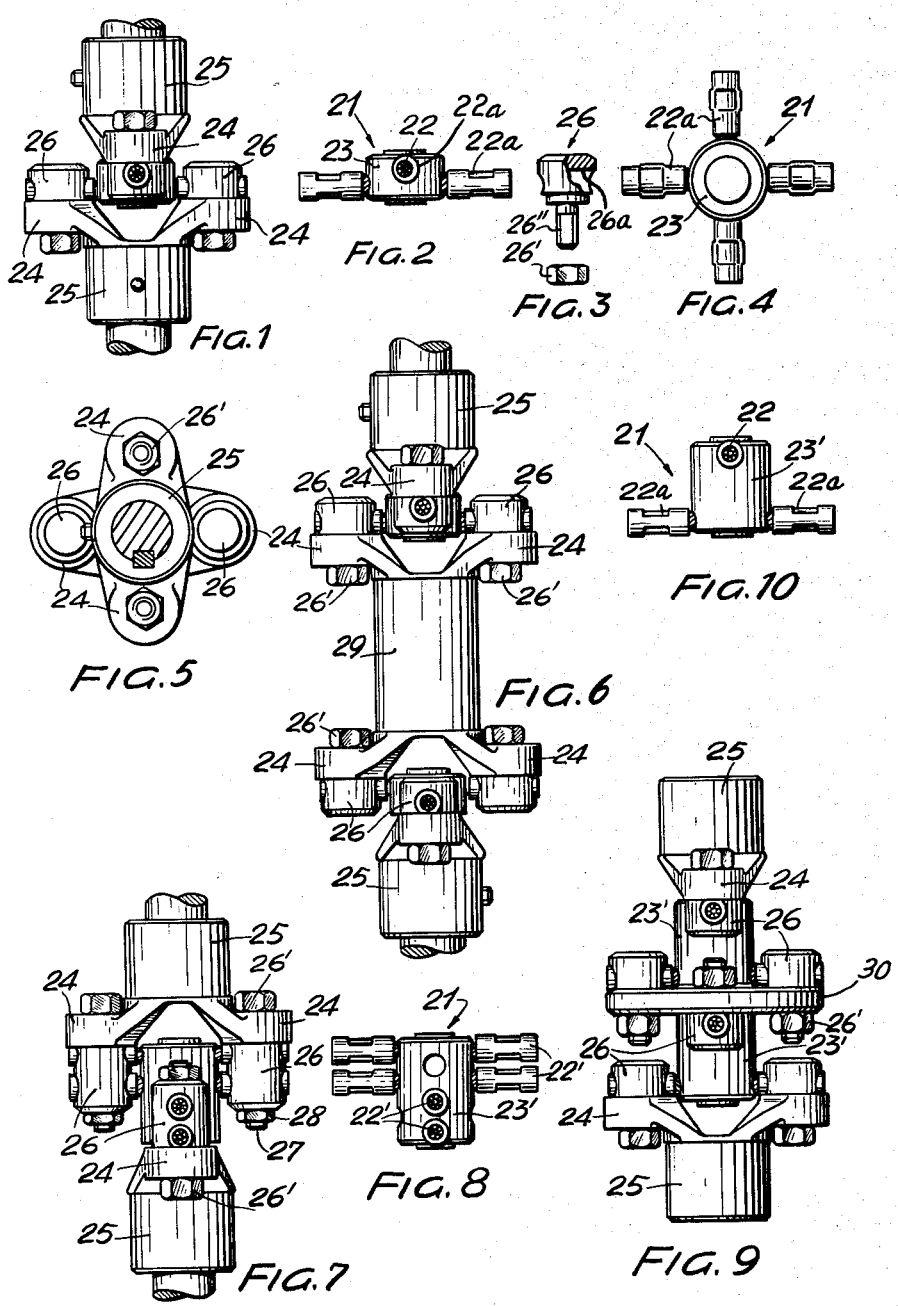
INVENTOR.
CARLO CAMOSSI _United States Patent Office_

3,238,744
Patented Mar. 8, 1966

3,238,744
VIBRATION AND SHOCK ABSORBER IN COUPLING
Carlo Camossi, Milan, Italy, assignor, by mesne assignments, to Cable Isolation Systems, Inc., New York, N.Y., a corporation of New York
Filed July 29, 1963, Ser. No. 298,188
Claims priority, application Italy, May 18, 1963, 35,169
6 Claims. (Cl. 64—12)

The invention refers to a resilient assembly able to absorb vibrations and/or shocks, and/or to transmit torques and twisting forces based on the principle of cable flexibility, and in particular on the flexibility of at least two cables arranged at an angle between them, in grooves or holes provided in a common block, through which they are made fast together in at least one anchoring point, their protruding ends being gripped by means of sleeves or clamps which in turn are made fast at said ends, and constituting anchoring points on members destined to exploit the performances of said antivibrating assemblage.

The device according to the invention, hereinafter, as described, wherein the cables are subjected to a twisting torsional-stress, may be assembled in constructions embodying many variants and improvements. A primary object of the invention is to provide a device offering the advantage of the possibility of disassembling the different parts, and especially of the central core, which embodies a block or other suitable means secured to the cables, for the purpose of replacing same when damaged or when it is necessary to obtain different performances.

In the different ways of embodiment that shall now be described, the core body or block, in order to better operate with a new core having modified parts, may have an elongated shape, that may be covered with a suitable resilient material (such as rubber or plastic material), and in certain cases it can be equipped with cables arranged in two pairs, or more so as to increase the stiffness of the core.

In particular, the present patent application foresees the following improvements of a non-exclusive paramount character:

(a) The anchoring of the cable ends to the fork arms through a bolt having clamping openings for receiving the cable ends;

(b) The joining of two forks in a single block, the cylindrical body which may be of different length, in order to form a unit of two coaxial operating resilient assemblies;

(c) A core of an elongated shape having two perpendicular cables with the cable arranged at its ends;

(d) An elongated shape core carrying two pairs or more of cables, one adjacent to the other;

(e) A unit having two operating and coaxial assemblies, obtained by the interposition of a ring-shaped connecting member between the two cores;

(f) A bolt for clamping with a double seat for the twin cable cores.

It is obvious that these improvements may be further changed, modified and adapted, especially considering the various and wide fields of application for this device.

To give a more detailed description of the present invention, reference is made to the attached drawing in which a number of embodiments are illustrated by way of example, and in which:

FIG. 1 shows in elevation a single core coupling, constructed of two perpendicular cables;

FIG. 2 and 4 represent respectively a side elevation and a top view of the core in FIGURE 1;

FIG. 3 is an exploded elevation of the member joining the cables with the forks;

FIG. 5 is a top view of FIGURE 1;

FIG. 6 is an elevation of a coupling constructed of two couplings of the type illustrated in FIGURE 1, made fast together;

FIG. 7 is an elevation of a coupling of the type of FIGURE 1, with its core formed by two pairs of cables;

In FIGURE 8 there is separately represented the core of the coupling in FIGURE 7;

FIG. 9 is an elevation of a combination of two couplings of the type in FIGURE 1, by means of an intermediate annular flange.

In the embodiments as represented in the drawings, there is one common feature:

(a) The core 21 is constructed of cables 22, single or in pairs 22' arranged perpendicular to each other, and bonded centrally in a block 23 or 23', preferably of cylindrical shape. Each cable end protruding from the block is secured in a collar, or sleeve 22a.

(b) The cable end anchoring on the arms 24 of the fork 25 is obtained through a screw type bolt 26, clamping each of the ends of the cable 22; said bolt will have one or two seats, or openings 26a, in the bolt head according to whether the cable is single or in pairs; in this last case, the opening 26a intersects the underface of the bolt head so that the cable adjacent to the fork arm 24 will be clamped thereagainst by fully tightening the nut 26' on the stem 26'' of the bolt 26; the outer cable in the pair will be clamped by the set screw 27 in its turn locked by the lock-nut 28.

On this common feature there are many possible different combinations to satisfy different requirements; of such combinations following are a few examples:

First the simplest embodiment shown in FIGURE 1 can be doubled in to a coupling as shown in FIGURE 6, wherein the central portion 29 is the union of two forks 25, the cylindrical body may have different lengths.

Again, the simplest combination of FIGURE 1 can have a core, the block 23' which carries two pairs of cables 22', making it much stiffer; this modifies remarkably its performance.

A core of the type shown in FIGURE 8 may be constructed of a block 23' and only two cables 22, placed at the ends of the block (FIGURE 10); this allows for the assembly of the two forks 25; two such cores being connected through an annular flange 30 by means of the standard bolts 26 (FIG. 9).

Therefore, from these combinations, that can be suggested by particular requirements, there can obviously be derived other more or less complex embodiments, always using parts as those described above; therefore all the variants that can result from the combination of those elements, will all fall of course in the field of protection of the present invention.

What is claimed:

1. Resilient coupling for transmitting torques and/or twisting forces while absorbing vibrations and shocks, comprising a pair of hubs adapted to be fixed to shafts to be coupled for rotation together, each of said hubs having a yoke with radial arms, a removable and replaceable core connected to said yokes for transmitting torques, said core including at least a pair of cables disposed at an angle to each other in a channel in a common block and made fast to the block in anchoring points, each of the ends of said cables protruding from the block and being clamped within a collar, each said yoke arm having an opening therethrough whose axis is parallel to the bore of its hub, a bolt passing through each opening intersecting its inner face, the head of each bolt having an opening transverse to the bolt and receiving the collar at one end of one cable pair, and a nut threaded on said bolt to engage said yoke arm to force the arm into tight but removable clamping engagement with the collar on the cable.

2. Resilient coupling according to claim 1 wherein said common block is elongated axially of said hubs and said pair of cables are spaced axially in the block so as to lie near the ends thereof, whereby said yoke arms when affixed to the core are spaced apart by nearly the length of said block.

3. Resilient coupling according to claim 1 wherein said core carries at least two pairs of crossing cables, one cable of each pair lying parallel and close to one another, and the head of each of said bolts having a pair of openings to receive a pair of cable end collars.

4. Resilient coupling according to claim 2 wherein said elongated block is formed in two parts disposed axially of said hubs, each of said parts carrying a pair of spaced crossing cables disposed near each of its ends, an annular connecting member between the two block parts connected to the adjacent pair of cables and said pair of yoke arms being connected to the other pair of cables.

5. Resilient coupling according to claim 3 wherein each of said bolt heads having two openings for seating the cable end collars is provided with an additional set screw for clamping the second collar in its opening.

6. Resilient coupling according to claim 1 wherein said core is formed by a metal portion clamping the cables.

References Cited by the Examiner

UNITED STATES PATENTS

| 1,096,235 | 5/1914 | Fox | 64—17 |
| 1,185,208 | 5/1916 | Lapp | 64—15 |
| 1,291,418 | 1/1919 | Cooney et al. | 64—17 |
| 1,316,563 | 9/1919 | Edwards | 64—13 |
| 1,498,712 | 6/1924 | York | 64—17 |
| 1,659,353 | 2/1928 | Dwyer | 64—12 |
| 2,525,580 | 10/1950 | Beler | 64—6 |
| 2,629,992 | 3/1953 | Anderson | 64—17 |
| 2,839,902 | 6/1958 | Glover | 64—6 |
| 2,855,767 | 10/1958 | Ahlen | 64—15 |
| 3,087,313 | 4/1963 | Kerley | 64—12 |

FOREIGN PATENTS 533,395   9/1931   Germany.

BROUGHTON G. DURHAM, *Primary Examiner.*

ROBERT C. RIORDON, *Examiner.*